Figure 1:
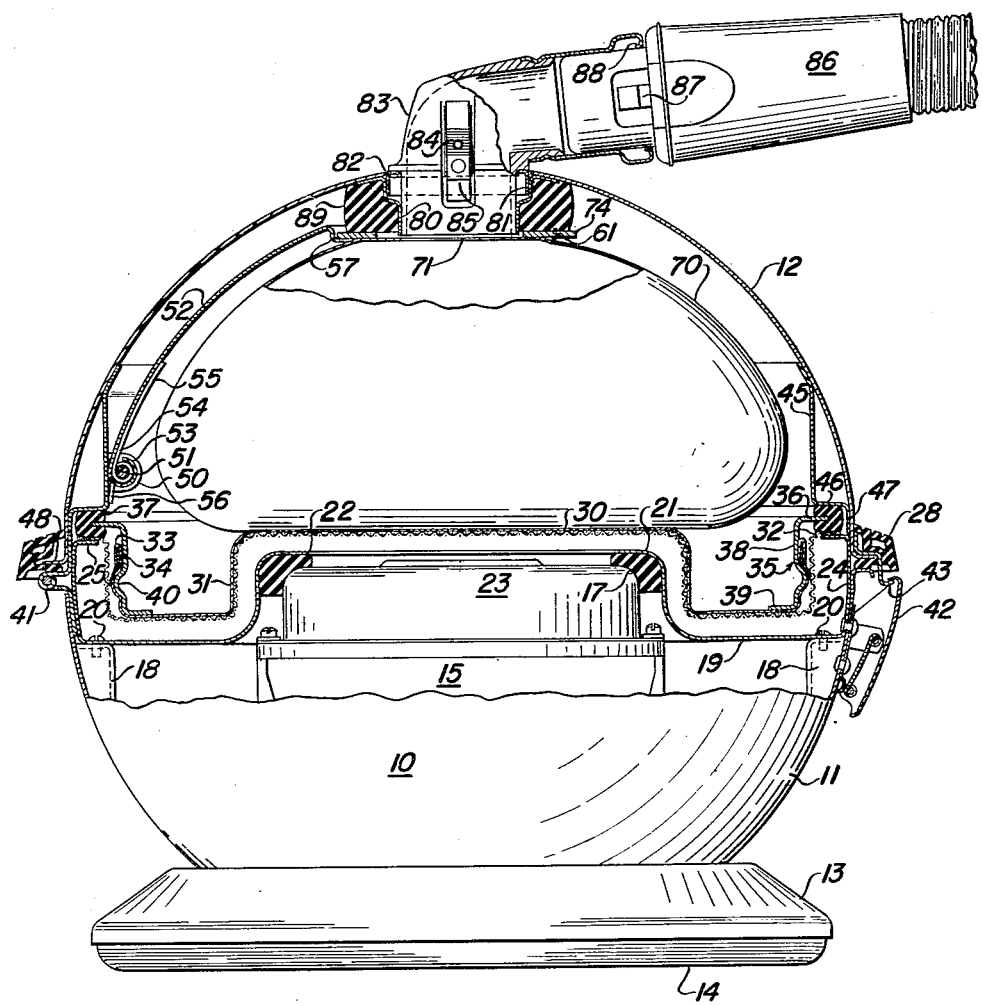

Oct. 16, 1956  W. A. HUMPHREY  2,766,844
SUCTION CLEANERS

Filed Sept. 16, 1954  3 Sheets—Sheet 1

Oct. 16, 1956  W. A. HUMPHREY  2,766,844
SUCTION CLEANERS

Filed Sept. 16, 1954  3 Sheets-Sheet 3

---

United States Patent Office 2,766,844
Patented Oct. 16, 1956

---

2,766,844

SUCTION CLEANERS

Warren A. Humphrey, Canton, Ohio, assignor to The Hoover Company, North Canton, Ohio, a corporation of Ohio Application September 16, 1954, Serial No. 456,465

20 Claims. (Cl. 183—37)

The instant invention relates to suction cleaners and more particularly to a novel arrangement for mounting filters therein.

This invention is particularly directed to suction cleaners of the type adapted to utilize a disposable filter bag, such as is usually made of a relatively inexpensive air pervious paper or like material. The filter bag is used in the cleaner to filter the dust and like litter from the dirty air stream generated by the motor-fan unit, and upon the bag being filled to the point where it is no longer effective as a filter, it is removed from the cleaner and replaced by a new filter bag, the filled bag being discarded along with its contents. In using suction cleaners of this type it may occur that the user will forget to replace the filter bag, and in the absence of any further filtering means, upon subsequent use of the suction cleaner the dirty air stream will be directed to the motor-fan unit, with the dust and like litter collecting therein and imparing the efficiency of said unit and of the cleaner generally. Accordingly, there is provided a secondary filter interposed between the filter bag or primary filter and the motor-fan unit to protect the latter should an attempt be made to use the cleaner without first installing a filter bag to collect the dust and like litter.

It is a prime object of the instant invention to provide a novel structure in a suction cleaner of the type referred to, for mounting the primary and secondary filters therein.

It is a further object of the instant invention to provide a novel mounting structure for the primary and secondary filters in a suction cleaner, whereby the filters are independently mounted to facilitate removal of either filter from the cleaner casing, without disturbing the other.

It is also an object of the instant invention to provide a novel structure in a suction cleaner for mounting a primary filter bag in one casing section of the cleaner, and a secondary filter in a second casing section of the cleaner, whereby either filter may be removed independently of the other upon separation of said cleaner casing sections.

Another object of the instant invention is to provide a novel structure in a suction cleaner for mounting a primary filter in one casing section of the cleaner, so that the filter may be separated from the remainder of the suction cleaner upon separation of that casing section from the remainder of the cleaner.

A further object of the instant invention is to provide a novel filter mounting means in a suction cleaner for maintaining the filter in constant connection with the air inlet conduit of the cleaner.

Still another object of the instant invention is to provide a novel means for engaging the mouth of a filter bag with the air inlet conduit of a suction cleaner to maintain said mouth in air tight connection with the air inlet conduit.

Figure 2:
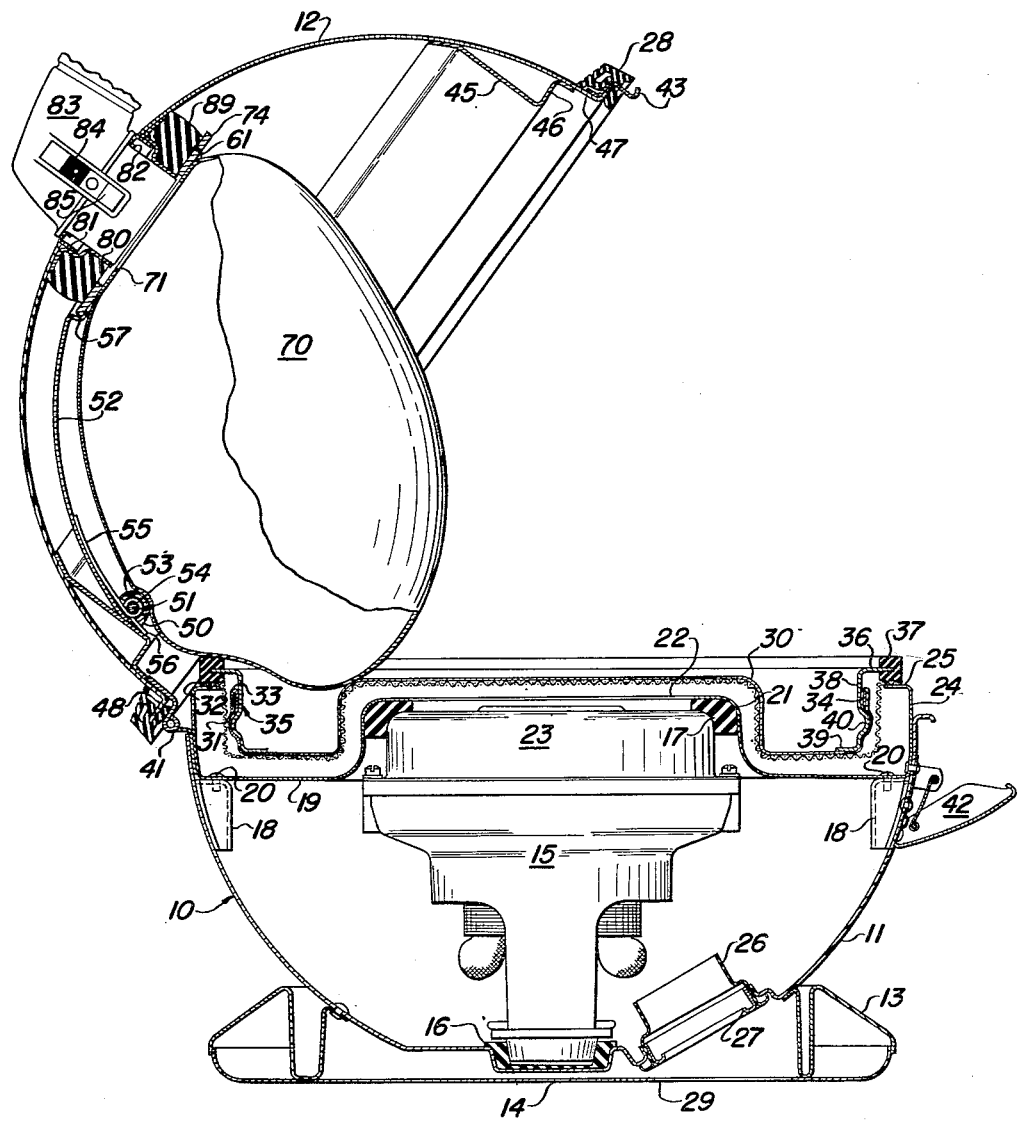
Figure 3:
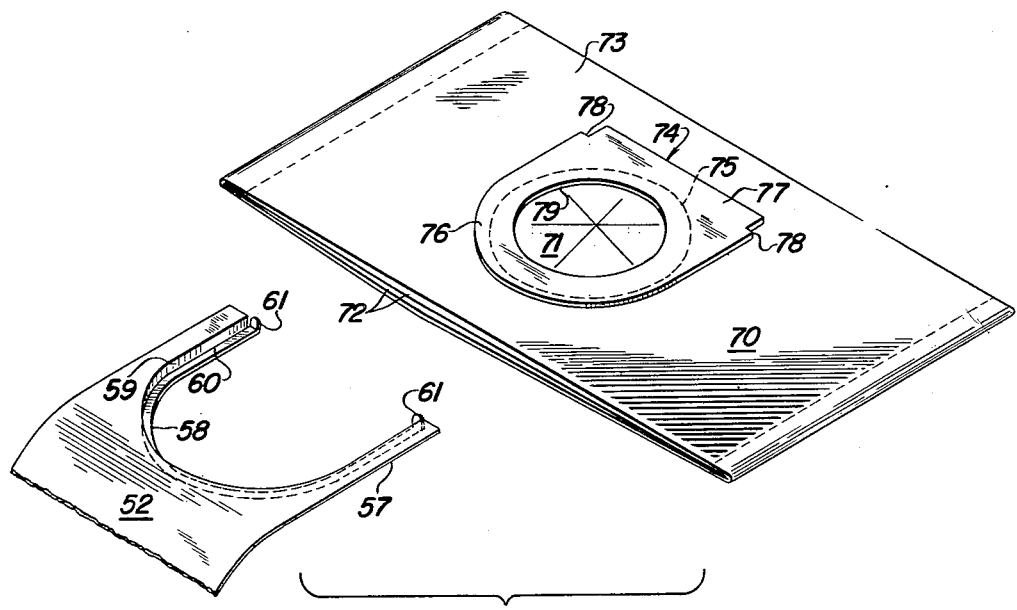
Figure 4:
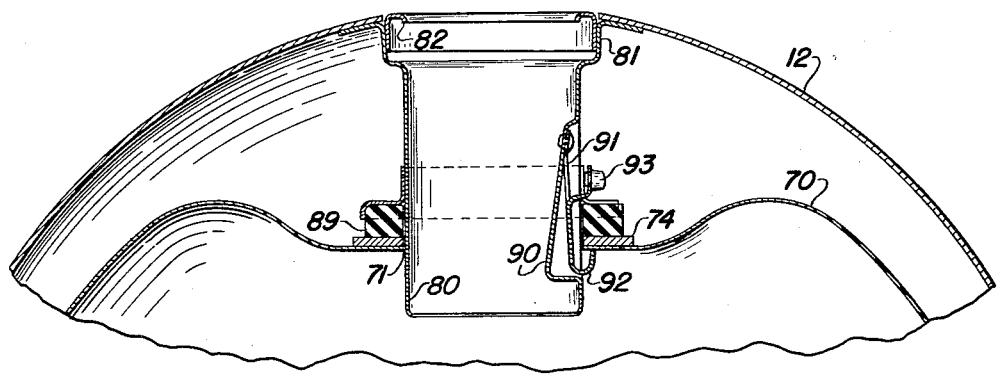

Further objects and advantages of the instant invention will appear from a consideration of the detailed description of the several preferred embodiments thereof which follows, reference being had to the accompanying drawings in which, Figure 1 is an elevational view, partly in section, of a suction cleaner embodying the instant invention, Figure 2 is a sectional view of the suction cleaner of Figure 1 with the casing sections in partially separated position, Figure 3 is a perspective view of the mounting means for the filter bag mouth and the filter bag, and Figure 4 is an elevational view in section of a modified form of the instant invention.

The instant invention is illustrated as embodied in a suction cleaner 10 having a spherical casing comprising a lower casing section 11 and an upper casing section 12, the lower casing section 11 being mounted on a supporting base 13 formed with a flat under surface 14 for skidding the cleaner from one position to another. The lower casing section 11 has mounted therein a motor-fan unit 15 supported at its bottom on a resilient, vibration absorbing seat 16. The top of the motor-fan unit 15 is supported in the cleaner by a resilient, vibration absorbing ring 17 engaging the top peripheral edge thereof.

A plurality of evenly spaced shoulders 18 are provided on the inner surface of the lower casing 11, and these support a partition or shield 19 secured thereto by screws 20 or like means. The partition 19 may be made of sheet metal and serves to separate in part the lower casing section 11 from the upper casing section 12. The partition 19 includes a centrally disposed well 21 in which the resilient supporting ring 17 is secured for positioning the top of the motor-fan unit 15 in the lower casing section 11. The central area of the well 21 is cut away to leave an opening 22 coextensive with the fan 23 to provide communication between the fan and the air inlet conduit 80 through the medium of the filters as will appear hereinafter.

The peripheral edge of the partition 19 is upturned to provide an annular side wall 24 coextensive with and closely fitting against the inner surface of the lower casing section 11. The upper edge of the annular wall 24 is inturned to provide a seating flange 25 for the secondary filter in the lower casing section 11.

The suction flow of air generated by the motor-fan unit 15 is exhausted through an outlet conduit 26 in the lower casing section 11. The outlet conduit 26 includes a latch engaging lip 27 for connection thereto of a conventional hose, when it is desired to use the cleaner as a blower, access being had to the exhaust conduit 26 through an opening 29 in the bottom of the supporting base 13 by tipping the cleaner 10 on its side and resting it on the bumper or guard ring 28 provided at the diametrical separation line of the cleaner casing sections.

The suction cleaner 10 includes a secondary filter 30 which is coextensive with the top of the lower casing section 11 and covers the central opening 22 over the motor-fan unit 15. The filter 30 serves the function of protecting the motor-fan unit from the entry and accumulation of dust and like litter should the user attempt to use the cleaner without first installing a filter bag therein. It also serves the additional function of maintaining the filter bar or primary filter in spaced relation to the motor-fan unit 15, so that the suction pressure thereof is applied to the full area of the primary filter, as will appear from the description.

The secondary filter 30 includes a substantially rigid backing member 31 made of a loosely woven wire mesh or the like, formed with a peripheral flange 32 supported on the seating flange 25 of the partition 19. The filter backing member 31 generally follows the contours of the partition 19 and is spaced therefrom over its entire area. The secondary filter 30 is preferably made of air pervious cloth or the like, and closely overlies the backing member. The peripheral edge of the secondary filter 30 is folded over upon itself and the bight 33 so formed encloses a resilient ring 34 for a purpose to be described. The secondary filter 30 is mounted on a ring 35 formed with an out-turned annular flange 36 having secured thereto an annular sealing gasket 37. A substantially vertical wall 38 depends from the flange 36 and terminates in an inwardly directed flange 39 for seating the secondary filter 30 on the backing member 31. The wall 38 includes a peripheral bead 40 preferably located below the mid-height of wall. In installing the secondary filter 30 on the annular ring 35, the resilient element 34 secured in the edge of the filter is stretched over the bead 40 to be disposed on the wall thereabove, thus preventing the secondary filter 30 from slipping off.

The upper casing section 12 is adapted to mate with the lower casing section 11 to form the spherical casing of the cleaner, the two sections being secured one to the other by means of a hinge 41 at one side of the casing sections. The lower casing section 11 carries a conventional toggle latch 42 opposite the hinge 41 adapted to engage a lip 43 on the upper casing section 12 for securing the two casing sections together and maintaining an air tight seal at the junction thereof.

Secured to the inner surface of the upper casing section 12 and spaced a short distance from the edge thereof, is an annular rib 45 presenting a downwardly facing shoulder 46 adapted to seat on the gasket for sealing the junction between the two hemispherical casing sections and providing an air tight seam therebetween. The edge 47 of the upper casing section 12, depending below the shoulder 46, mates with the annular wall 24 of the partition 19 and includes an outturned annular flange 48 to which is secured the bumper or guard ring 28 made of rubber, plastic or like yieldable material. The bumper ring 28 in part overlies the junction of the two casing sections and serves to improve the appearance of the cleaner when the two sections are secured one to the other in closed position.

A pair of spaced ears 50 projects from the annular rib 45 in the upper casing section 12 and have secured thereto a pivot pin 51 extending between the ears. An arm 52 having its lower end 53 curled around the pivot pin 51 projects upwardly therefrom, substantially parallel to the inner surface of the upper casing section 12. A spring 54 is disposed on the pivot pin 51 intermediate the pin and the curled end 53 of the arm 52. The legs 55, 56 of the spring 54 bear against the arm 52 and the rib 45 for biasing the arm of the pivot pin 51 in a direction towards the inner surface of the upper casing section. The opposite end of the arm 52 terminates a bifurcated portion 57 forming a seat 58 for the mouth 71 of a filter bag 70. The filter bag supporting means, comprising the arm 52 and the seat 58 for the filter bag mouth, may most conveniently be blanked from sheet metal stock.

The bifurcated end 57 of the arm 51 forming the seat 58 for the filter bag mouth 71 comprises a substantial vertical shoulder 59 coextensive with the seat 58 and a laterally extending ledge 60 for reception of the filter bag. The ledge 60 at either end terminates in an upstanding detent 61 for securing the filter bag 70 thereon.

In the preferred embodiment of the invention, the filter bag 70 may take any of a number of known forms, the one illustrated in the drawings being of the type which is initially folded flat with a plurality of pleats 72 formed in the side walls thereof, and including a mouth 71 having a lanced opening formed in one of the flat walls 73 thereof. A collar 74 made of stiff material, such as cardboard or the like, is secured to the filter bag wall 73 over an annular area 75 surrounding the mouth 71 and provides a convenient means for mounting the filter bag. The collar also serves to reinforce the wall of the filter bag 70 in the area of the mouth 71 and may be secured thereto by means of adhesive, stitching or the like. The edge 76 of the collar 74 is not secured to the material of the filter bag, but remains free to form a filter bag supporting flange surrounding the mouth thereof. The profile of the collar 74 is complementary to the bifurcated end of the arm 52 forming the seat 58 for the filter bag mouth. The bag supporting flange seats on the ledge 60 and abuts against the shoulder 59, thereby positioning the filter bag mouth 71 for engagement with the air inlet conduit 80. The detents 61 engage the reinforcing collar 74 behind the shoulders 78 and prevent the collar from sliding off the seat 58. To remove the filter bag 70 from the seat 58 it is necessary to grip the front edge 77 of the collar 74 and lift it slightly from the seat to slide it over the detents 61.

Centrally located in the top of the upper casing section 12 is the air inlet conduit 80 formed with an enlarged diameter portion 81 at the wall of the casing, and having secured therein a latch engaging lip 82. A cleaning tool hose connector 83 may be secured therein by means of a conventional spring pressed latch 84 formed with a tongue 85 to engage under the lip 82. The usual cleaning tool hose 86 may be secured to the inlet end of the hose connector 83 by engaging a spring pressed latch 87 thereof under a latch engaging lip 88.

The filter bag supporting means, including the seat 58 mounting the filter bag mouth is spring biased upwardly towards the air inlet conduit 80. The collar 74 is seated in position on the seat 57 for the air inlet conduit 80 to project through the opening 79 therein for communication of the conduit 80 with the interior of the filter bag 70. Surrounding the air inlet conduit 80 is an annular resilient gasket 89 against which the collar 74 is pressed by the bifurcated portion 57 for maintaining an air tight seal at the junction of the filter bag mouth 71 and the air inlet conduit 80.

It is thus seen that the filter bag 70 is supported entirely within the upper casing section 12 independently of the secondary filter 30 and of the lower casing section 11. Thus upon separating the two casing sections the primary filter or filter bag 70 will be completely removed from over the secondary filter 30 so that the latter may be withdrawn if necessary. Referring to Figure 1, it is seen that with the casing sections closed one on the other and with the filter bag 70 mounted in operative position the bag is supported at its underside by the secondary filter 30, thus maintaining it in spaced relation to the motor-fan unit 15 so that the suction flow of air is operative over the whole surface of the primary filter for most effective cleaning action.

A second embodiment of the invention is illustrated in Figure 4. In this embodiment the air inlet conduit 80 is somewhat longer, and projects into the filter bag 70 through its mouth and the reinforcing collar 74. The wall of the air inlet conduit 80 includes a recessed portion 90 in which is riveted a hanger 91 including a hook 92 for mounting the filter bag in the upper casing section 12. The hook 92 of the hanger 91 is disposed within the mouth 71 and engages the wall of the filter bag 70 behind the collar 74 to retain it on the air inlet conduit 80, and draws the collar 74 against an annular resilient gasket 89 surrounding the air inlet conduit 80 for providing the requisite air tight seal at the junction of the filter bag mouth and the air inlet conduit. A release button 93 provided on the hanger 91 is utilized to push it back into the recess to release the filter bag from the air inlet conduit 80. It will be apparent that in this embodiment also, the filter bag or primary filter is supported entirely within the upper casing section 12 so that it may be withdrawn from the secondary filter independently thereof, to leave the latter completely exposed. Although only one hanger is illustrated in the drawings, it is contemplated that more than one such hanger may be provided as may be deemed necessary.

The invention has been illustrated and described in two preferred embodiments thereof. Modifications of the invention, falling within the scope thereof, will occur to

I claim:

1. In a suction cleaner having a two-part casing including first and second casing sections separably joined one to the other, one of said casing sections including a motor-fan unit for producing a suction flow of air, and the other of said casing sections including an air inlet conduit for admission of a dirty stream, secondary filter means disposed intermediate said casing sections, said secondary filter means being seated on said one casing section for removal therefrom upon separation of said casing sections, a primary filter in said second casing section having a mouth for connection to the air inlet conduit for directing the dirty air stream thereinto to separate dust and like litter therefrom, means mounting said primary filter on said second casing section and connecting the mouth thereof to the air inlet conduit, said mounting means being located wholly within the second casing section, whereby the primary filter is independently mounted therein and the secondary filter is exposed for removal upon separation of said casing sections.

2. In a suction cleaner as recited in claim 1, in which the first and second casing sections include complementarily formed portions adapted to be mated one with the other upon joining said casing sections, and the secondary filter means includes a resilient gasket adapted to be disposed intermediate said mating casing portions and providing an air-tight seal at the junction of said casing sections.

3. In a suction cleaner as recited in claim 1, in which the filter mounting means comprises an arm including a seat for the mouth of the filter bag, said arm being biased to constantly dispose the seat in contiguity to the air inlet conduit for connection of the filter bag mouth thereto.

4. In a suction cleaner as recited in claim 1, in which said filter mounting means is disposed on the air inlet conduit and engages the filter bag for retaining the mouth thereof on the conduit in constant connection therewith.

5. In a suction cleaner as recited in claim 4, in which the filter mounting means includes a hangar releasably spring biased into engagement with the filter bag to retain the mouth thereof on the air inlet conduit in constant connection therewith.

6. In a suction cleaner having a motor-fan unit generating a suction flow of air for gathering dust and like litter, an air inlet conduit for the admission of a dirty air stream, and a separable casing section having the air inlet conduit located therein, means for mounting a filter bag having a mouth in said casing section, said mounting means being wholly disposed within said casing section and including a seat for the mouth disposed contiguously to the air inlet conduit for connection of the mouth thereto, whereby the dirty air stream is directed into the filter for separation of the dust and like litter therefrom.

7. In a suction cleaner as recited in claim 6, in which the filter mounting means is pivotedly secured to the casing section and spring biased toward the air inlet conduit to constantly maintain the filter bag mouth connected thereto.

8. In a suction cleaner as recited in claim 6, in which the filter bag is formed with a reinforcing collar surrounding the mouth and having free edges forming a bag supporting flange, said filter bag being adapted to be supported on the seat with the flanges seating thereon, and the air inlet conduit including a resilient gasket surrounding the conduit and adapted to bear on the collar in opposition to the seat to provide an air-tight seal at the junction of the mouth and the air inlet conduit.

9. In a suction cleaner having a filter bag with a mouth adapted to be connected to an air inlet conduit for the admission thereto of a dirty air stream generated by the cleaner and a collar reinforcing the mouth, means for mounting the filter bag in the cleaner with the mouth thereof connected to the air inlet conduit comprising a seat for the mouth, said seat embracing the collar and including detent means engaging shoulders on the collar to retain it on the seat.

10. In a suction cleaner having a filter bag with a mouth adapted to be connected to an air inlet conduit for the admission thereto of a dirty air stream generated by the cleaner, a flat collar secured to the bag surrounding the mouth, said collar being free at its edges and forming a laterally extending flange for supporting the filter bag, means for mounting the filter bag in the cleaner comprising a flat plate formed with a bifurcated end for embracing the collar and seating the flange, and detent means engaging shoulders on the collar to retain it on the plate with the mouth in constant connection with the air inlet conduit.

11. In a suction cleaner as recited in claim 10, in which the bifurcated end of the plate includes a depressed portion forming a flat seat, said seat and collar being complementarily formed, the seat including a shoulder for locating the collar on the seat to mount the filter bag in the cleaner with the mouth thereof aligned with the air inlet conduit for connection thereto.

12. In a suction cleaner having a filter bag with a mouth adapted to be connected to an air inlet conduit for the admission thereto of a dirty air stream generated by the cleaner, a flat collar secured to the bag surrounding the mouth, said collar being free at its edges and forming a laterally extending flange for supporting the filter bag, means for mounting the filter bag in the cleaner comprising a flat plate formed with a bifurcated end for embracing the collar and seating the flange.

13. In a suction cleaner as recited in claim 12 in which the bifurcated end of the plate includes a depressed portion forming a flat seat, said seat and collar being complementally formed, the seat including a shoulder for locating the collar on the seat to mount the filter bag in the cleaner with the mouth thereof aligned with the air inlet conduit for connection thereto.

14. In a suction cleaner having a filter bag with a mouth for connection to an air inlet conduit for admission thereto of a dirty air stream generated by the cleaner and a collar reinforcing the mouth, means for mounting the filter bag in the cleaner with the mouth thereof connected to the air inlet conduit comprising, an arm pivotally secured to the suction cleaner and including a bifurcated end disposed in contiguity to the air inlet conduit and forming a seat for the mouth of the filter bag, the pivotal mounting for the arm including spring means for constantly biasing the arm and the seat toward the air inlet conduit, said seat embracing the collar and including detent means engaging the collar to retain it on the seat with the filter bag mouth in constant connection with the air inlet conduit.

15. A filter bag for use with a suction cleaner, said filter bag comprising a flat ended envelope having a mouth adapted to be connected to an air inlet conduit for the admission thereto of a dirty air stream generated by the cleaner, a flat collar secured to said flat end within the perimeter of the latter, surrounding said mouth and having an opening in alignment therewith, said collar being free of said flat end at its edges and forming a laterally extending flange for receiving a supporting seat between said flange and said flat end and including a shoulder adapted to be engaged by the seat for retaining the filter bag thereon.

16. A filter bag as recited in claim 15 in which the flat collar is a rigid reinforcing member complementally formed with respect to the seat.

17. In a suction cleaner having a filter bag with a mouth adapted to be connected to an air inlet conduit for admission thereto of a dirty air stream generated by the cleaner, a collar reinforcing the mouth, means forming a seat for mounting the filter bag in the cleaner with said mouth connected to the air inlet conduit, said seat embracing said collar and including detent means engaging shoulders on said collar to retain it on said seat, and gasket means at the junction of the air inlet conduit and the filter bag mouth forming an airtight seal.

18. In a suction cleaner as recited in claim 17 in which the gasket is secured to the periphery of the air inlet conduit and bears on the reinforcing collar surrounding the filter bag mouth.

19. In a suction cleaner as recited in claim 17 in which the gasket bears on the reinforcing collar in opposition to the seat.

20. A suction cleaner, a motor-fan unit for drawing dirt laden air through a portion of the cleaner, said cleaner being formed to provide a passage for the dirt laden air, said passage including a fitting having an opening through which dirt laden air passes, a filter bag having an inlet mouth positioned to receive air from said fitting, mounting means for supporting said filter bag with said inlet mouth in alignment with the opening in said fitting, said mounting means comprising a plate like member secured to said filter bag about said inlet mouth having an opening in alignment therewith and with free edges to one side of said opening and a member supported by said cleaner having a bifurcated seat for receiving the free edges of said plate like member and spring means for biasing said cleaner supported member toward said fitting to force said plate like member into sealing engagement with said fitting.

References Cited in the file of this patent
UNITED STATES PATENTS

| | | |
|---|---|---|
| 2,514,280 | Hammell | July 4, 1950 |
| 2,532,933 | Nuffer | Dec. 5, 1950 |
| 2,652,902 | Sheahan | Sept. 22, 1953 |
| 2,699,834 | Holm-Hansen | Jan. 18, 1955 |